US007573221B2

(12) United States Patent
Rock

(10) Patent No.: US 7,573,221 B2
(45) Date of Patent: Aug. 11, 2009

(54) WIRELESS LIFTGATE CONTROL SYSTEM

(75) Inventor: Kenneth Rock, Tallmadge, OH (US)

(73) Assignee: Waltco Truck Equipment Company, Tallmadge, OH (US)

( * ) Notice: Subject to any disclaimer, the term of this patent is extended or adjusted under 35 U.S.C. 154(b) by 292 days.

(21) Appl. No.: 11/610,856

(22) Filed: Dec. 14, 2006

(65) Prior Publication Data

US 2008/0143280 A1   Jun. 19, 2008

(51) Int. Cl.
*G05D 3/00* (2006.01)
(52) U.S. Cl. ................... 318/466; 318/443; 318/283; 49/26; 49/281; 49/2
(58) Field of Classification Search ............... 318/445, 318/466, 443, 468, 283, 286; 49/26, 28
See application file for complete search history.

(56) References Cited

U.S. PATENT DOCUMENTS

| 5,851,050 | A |    | 12/1998 | Squire et al. |        |
|-----------|----|----|---------|---------------|--------|
| 6,411,054 | B1 | *  | 6/2002  | Van Wiemeersch | 318/445 |
| 2003/0044266 | A1 | * | 3/2003 | Vandillen et al. | 414/537 |

OTHER PUBLICATIONS

Lodar Wireless Solutions—Lodar Industrial Radio Wireless Remote Controls, website: http://www.lodar.com/, Jun. 13, 2005.
Alta Resources—Wireless Motor Control System, website: http://dicor.com/alta.html, Jun. 13, 2005.

* cited by examiner

*Primary Examiner*—Rina I Duda
(74) *Attorney, Agent, or Firm*—Emerson, Thompson & Bennett; Roger D. Emerson; Timothy D. Bennett

(57) ABSTRACT

A wireless control system can be used to selectively adjust the position of a liftgate platform with respect to a vehicle cargo hold. The wireless control system includes a transmitter for use in transmitting a wireless control signal, a receiver that receives the wireless control signal transmitted by the transmitter and communicates a corresponding control signal to an actuation device to adjust the platform and, a transmitter detection system that prevents the actuation device from operating unless the transmitter is positioned in a predetermined location.

15 Claims, 5 Drawing Sheets

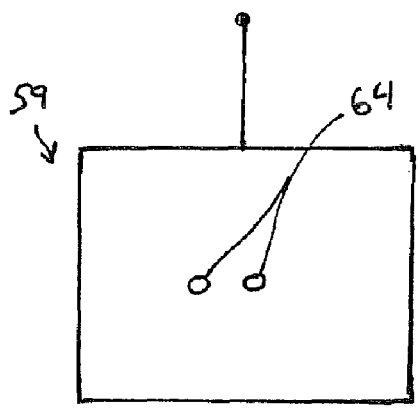
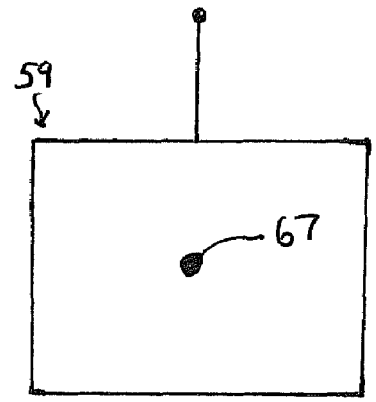
Fig - 5       Fig - 6
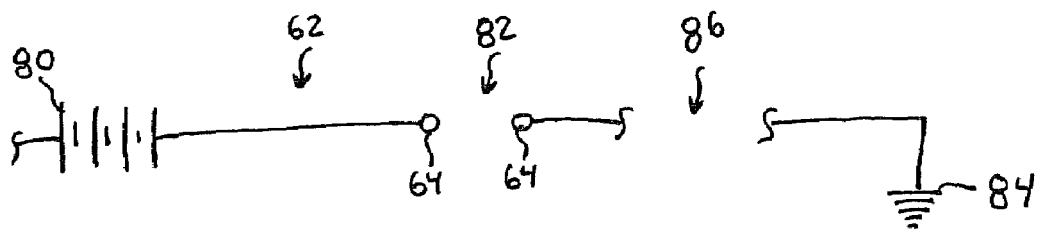
Fig - 7
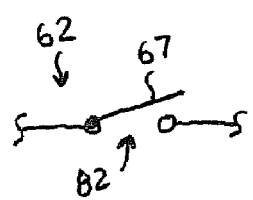
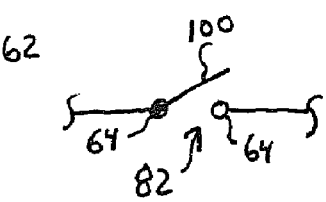
Fig - 8       Fig - 9

WIRELESS LIFTGATE CONTROL SYSTEM

I. BACKGROUND OF THE INVENTION

A. Field of Invention

This invention pertains to the art of methods and apparatuses for vehicle liftgates, and more specifically to a wireless control system for a vehicle liftgate.

B. Brief History

It is well known in the art to provide a liftgate on the rear of a vehicle having a cargo hold or bed. The liftgate raises and lowers on demand by engaging actuators that power the liftgate. When the liftgate is in a raised position, the liftgate platform is at the level height of the vehicle bed, and cargo can be loaded and/or unloaded from the bed. When the liftgate is in a lowered position, cargo can be loaded and/or unloaded onto the liftgate platform. Typically, the liftgate is operated with a controller that includes buttons and/or switches that, when manipulated, engage the actuators to raise and lower the liftgate.

Applicants believe that, for safety precautions, it is better to have the liftgate operator positioned relatively close to the liftgate as the liftgate platform is raised and lowered. This makes it easy for the liftgate operator to observe the operation of the liftgate and, for example, to immediately stop the motion of the liftgate platform if the cargo appears to be unsecured. Furthermore, liftgates often do not include side panels. This permits the liftgate to fold into a compact configuration during periods of non-use. Because of the open sides on the liftgate, and particularly as the liftgate is being raised, the cargo needs to be carefully watched and handled to prevent it from falling off of the liftgate. To achieve these results, it is advantageous to fix the position the liftgate control at the rear of the vehicle so that the operator is required to be relatively close to the liftgate and can easily view the cargo while operating the liftgate.

Another known aspect of liftgates relates to the wiring typically used in connecting the components of a liftgate assembly. Typically, wire harnesses or other conductors are routed through the frame structure of the vehicle and connected to a power supply and the actuators of the liftgate. This can be a cumbersome installation process particularly in after-market installations. It would be advantageous to utilize a wireless control to send signals to the actuators of the liftgate thereby reducing or eliminating conductors that may be prone to damage during use of the liftgate.

What is needed, therefore, is a liftgate control that can be easily installed without the use of cumbersome wire harnesses and that is positioned relatively close to the liftgate. Additionally, it would advantageous to provide a wireless control that can only be operated if the operator is in plain view of the liftgate.

II. SUMMARY OF THE INVENTION

According to one aspect of this invention, a wireless control system is used with a vehicle that has a cargo hold and a liftgate assembly. The liftgate assembly has a platform and an actuation mechanism for use in selectively adjusting the position of the platform with respect to the cargo hold. The wireless control system includes: (a) a transmitter for use in transmitting a wireless control signal, the transmitter having controls for selectively adjusting the platform; (b) a receiver that receives the wireless control signal transmitted by the transmitter and communicates a corresponding control signal to the actuation device to adjust the platform; and, (c) a transmitter detection system that prevents the actuation device from operating unless the transmitter is positioned in a predetermined location.

According to another aspect of the invention, the transmitter detection system includes an electric circuit that is closed only when the transmitter is in the predetermined location.

According to another aspect of the invention, the transmitter cannot transmit the wireless control signal when the electric circuit is open.

According to another aspect of the invention, the actuation device is inoperative regardless of the wireless control signal when the electric circuit is open.

According to another aspect of the invention, the wireless control system also includes a jumper circuit for use in selectively overriding the electric circuit.

According to another aspect of the invention, the wireless control signal has a unique address data and the receiver communicates the corresponding control signal to the actuation device responsive to the unique address data.

According to still another aspect of this invention, the transmitter has a self-contained power supply.

One advantage of this invention is that there is no need to route a wire harness through the vehicle structure.

Still another advantage of this invention is that the control is positioned relatively close to the liftgate so that the liftgate operator can easily observe the operation of the liftgate and the status of the associated cargo.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 5 is a back view of one embodiment transmitter showing a pair of open contacts.

FIG. 6 is a back view of another embodiment transmitter showing a magnetic contact.

FIG. 7 is a schematic representation of the electric circuit that may be used with this invention.

FIG. 8 is a schematic representation of a magnetic contact that can be used with the electric circuit of FIG. 7.

FIG. 9 is a schematic representation of a jumper circuit that can be used with the electric circuit of FIG. 7.

IV. DESCRIPTION OF THE INVENTION

Figure 1:
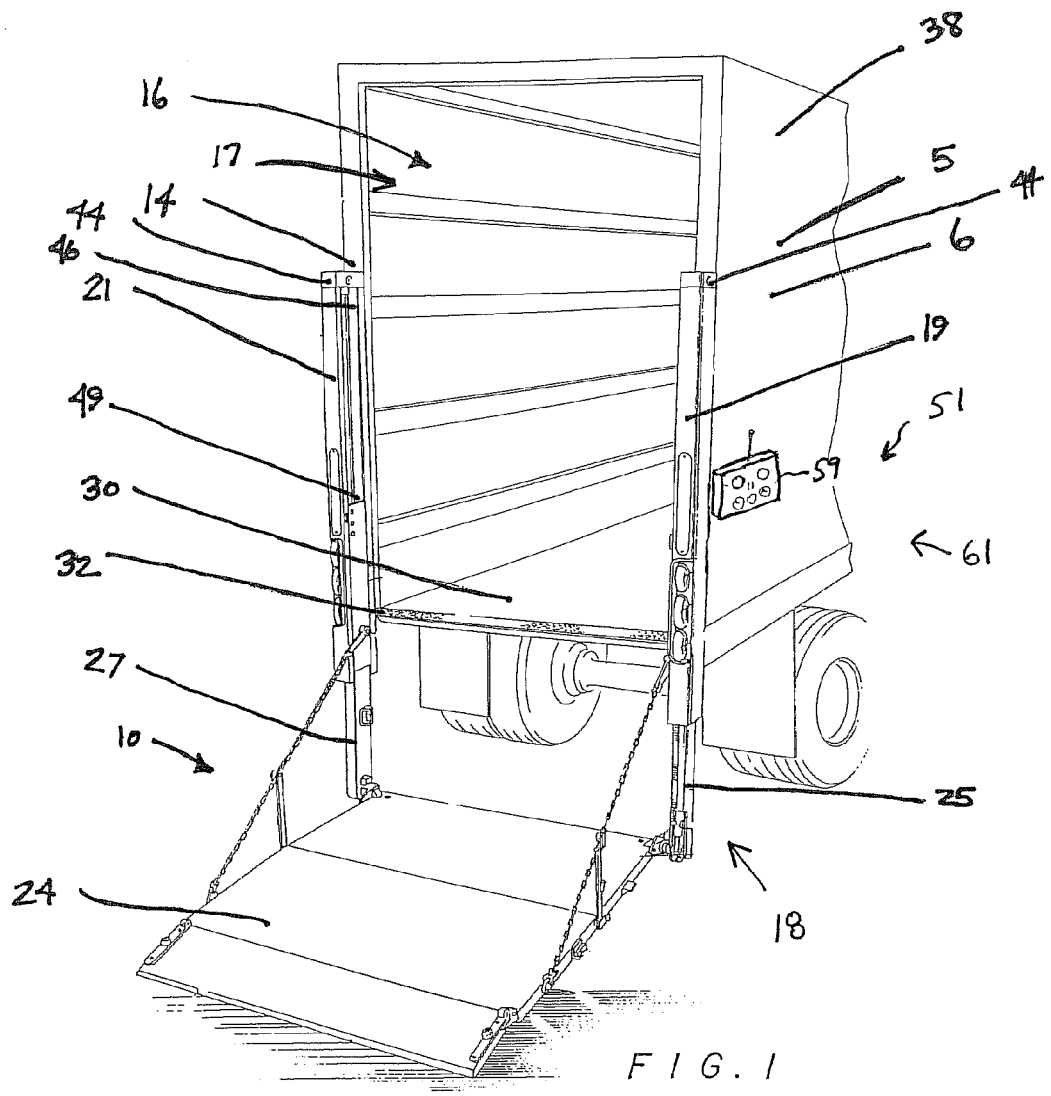
FIG. 1 is a rear perspective view of a vehicle having a liftgate mechanism and a wireless control system according to this invention.

Referring now to the drawings wherein the showings are for purposes of illustrating one or more embodiments of the invention only, and not for purposes of limiting the same, FIG. 1 shows a liftgate assembly, shown generally at 10, mounted in one of its usual environments, on the rear vertical corner posts 14 of the rear end opening 16 of a truck 5 having a cargo hold 17. The liftgate assembly 10 includes a platform 24 and an actuation mechanism 18 for use in selectively adjusting the position of the platform 24 with respect to the cargo hold 17. The platform 24 is shown in its full down position in FIGS. 1 and 4 and it is shown partially folded in FIG. 3. The actuation mechanism 18 and thus the platform 24 and other liftgate assembly components may be controlled using a control system 51 according to this invention. It is to be understood that this invention will work equally well with liftgates positioned in any conventional manner including on vans and on the sides of truck trailers.

Figure 3:
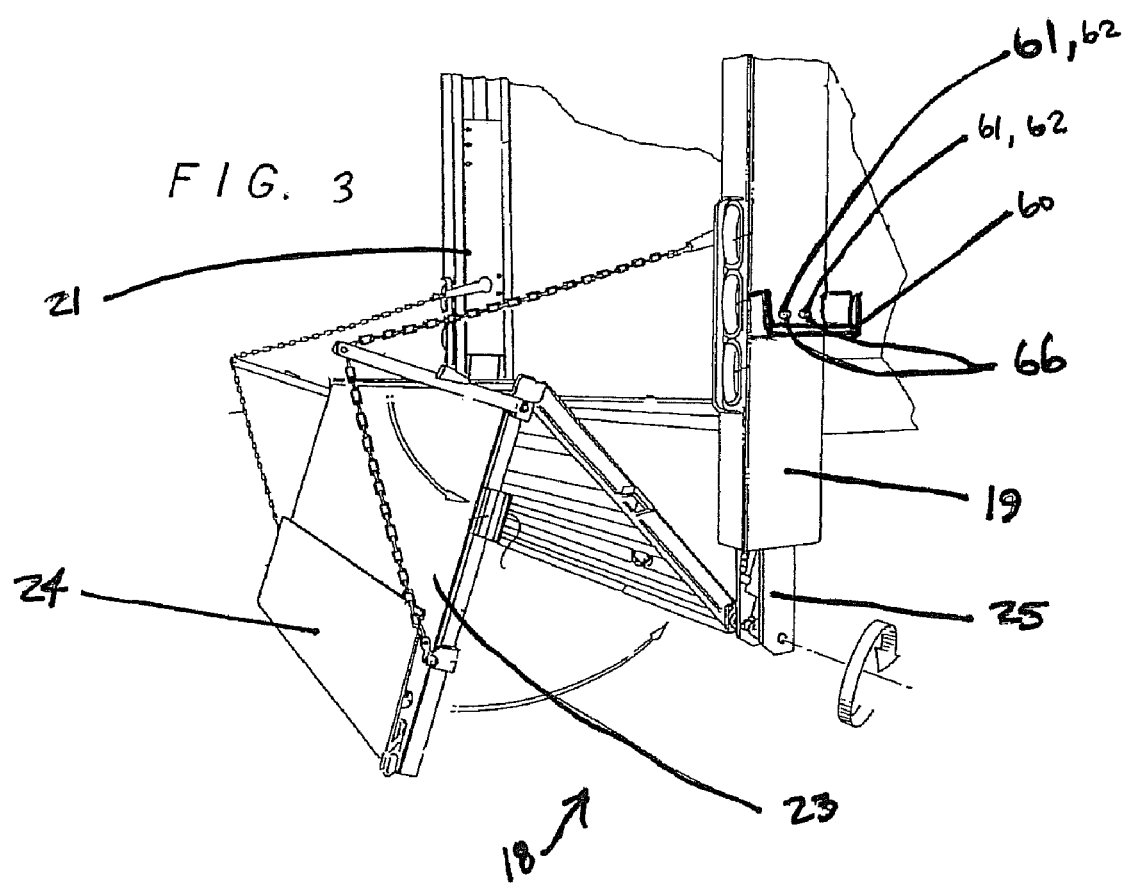
FIG. 3 is perspective view of a vehicle showing a platform in a folded position
Figure 4:
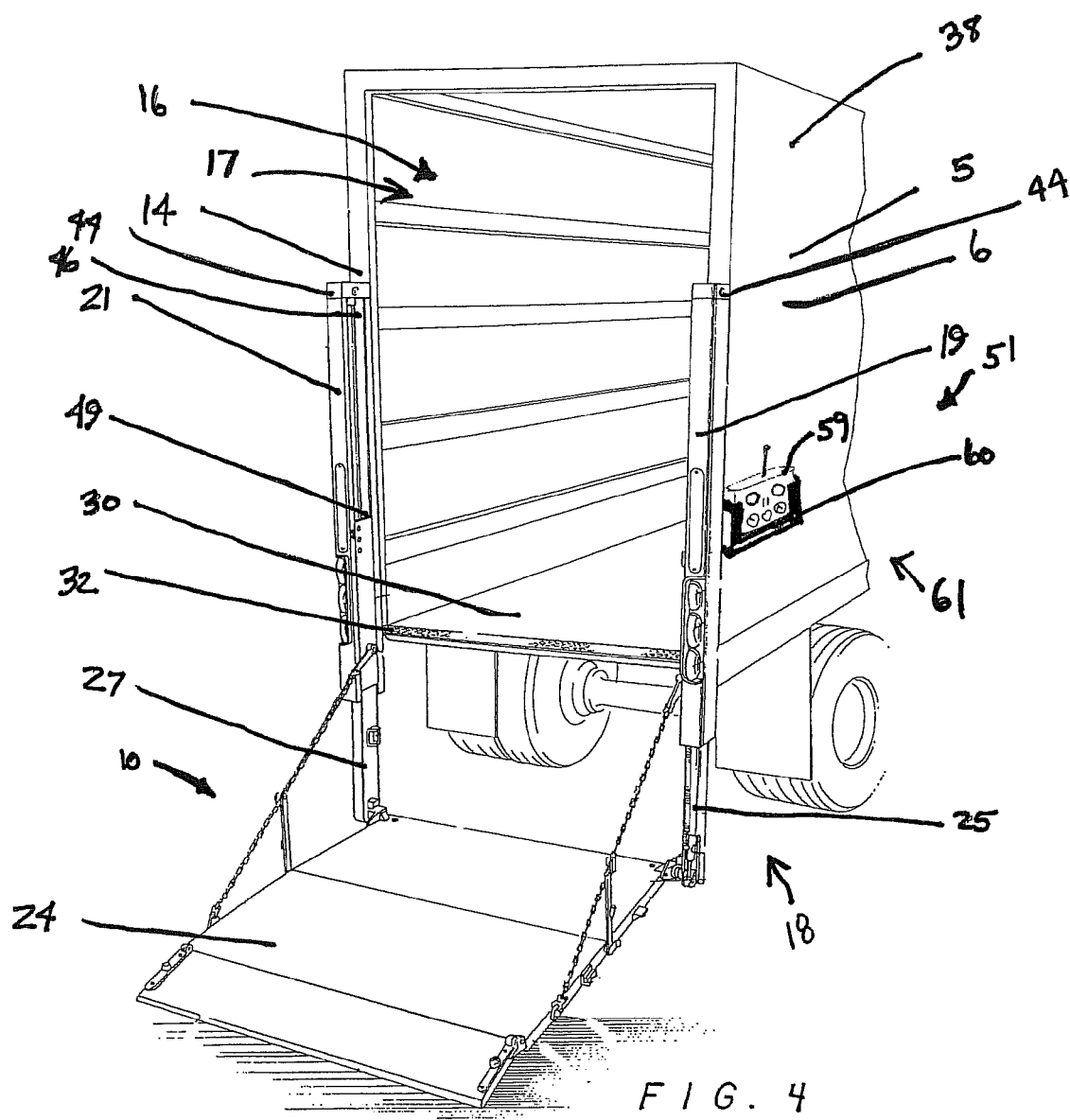
FIG. 4 is a rear perspective view of a vehicle having a liftgate mechanism and a wireless control system similar to FIG. 1 but showing a cradle used to hold the transmitter in place during use.

With reference now to FIGS. 1 and 3, the actuation mechanism 18 may include a right hand or curb side columnar power assembly 19 and a left hand or street side columnar power assembly 21. The curb side columnar assembly 19 may include a downwardly extendable and upwardly retractable runner assembly 25. The street side columnar assembly 21 may include a companion downwardly extendable and vertically retractable runner assembly 27. As will be discussed in a subsequent paragraph, the telescopically mounted runner assemblies 25, 27 may be hydraulically operable in unison for raising and lowering the platform 24 between a ground level (shown in FIG. 1) and the level of a bed 30 of the body 6. Another component of the liftgate assembly 10 may include a threshold plate 32 that is secured in a horizontally extending position to the rear edge of the bed 30. The columnar assemblies 19, 21 may be mirror image assemblies having substantially identical components. The curb side assembly 19 may differ in that the lower end portion of its runner assembly 25 may be fitted with a hydraulically powered crank mechanism, not shown, to effect movement of the platform 24 sections through the various stages. It should be noted that while the present embodiment discusses hydraulic actuation, this invention will also work well with any other type of actuation mechanisms 18 chosen with sound engineering judgment including electric actuation and pneumatic actuation. It should be further noted that while the present embodiment discusses a large platform liftgate, this invention may be applied to any type or size of liftgate.

With continuing reference to FIGS. 1 and 3, under a box-like column cap 44, the upper end of each column 19, 21 rigidly mounts a parallel, spaced apart pair of substantially vertical power cylinder support plates 46 oriented parallel to the major axis of the column profile and having opposite ends resting on the column front and rear walls. The support plates 46 may be used to support a fluid powered linear actuator or cylinder 49 that is suspended from a pin, located adjacent the upper end of each column 19, 21 not shown, as to hang within the cavity of the columns 19, 21 respectively. The lower end of the hydraulic cylinder 49 may be displaceable in a direction parallel to the major axis of the column 19, 21. It should be noted that any quantity of hydraulic cylinders 49 may be used. However, in this embodiment one cylinder 49 is used in each of the columns 19, 21. The cylinder 49 may be of either the single or double acting type and may be controlled by valves, not shown. Electrical solenoids integrated into the valves may be used to shift spools, also not shown, as is very well known in the art. Shifting of the spools may cause hydraulic fluid to flow into and out of the cylinders 49 for use in providing a lifting force used to raise and lower the platform 24 and associated cargo. An entire hydraulic system including hydraulic pump control valves, operated by electrical solenoids and associate fluid power lines may be included. In that the make up of hydraulic systems is well known in the art, no further explanation will be offered at this time.

Figure 2:
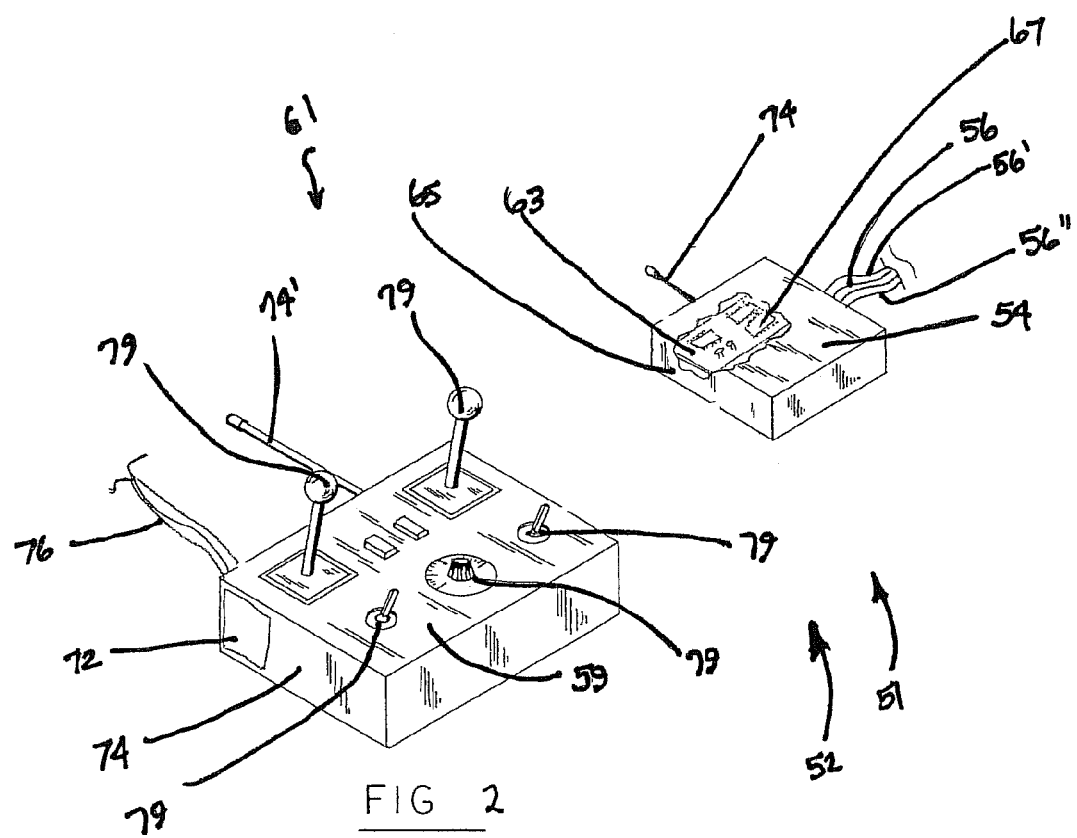
FIG. 2 is perspective view of the wireless control system showing a transmitter and a receiver.

With reference now to FIGS. 1, 2 and 3, the actuation mechanism 18 may be controlled using the control system 51. The control system 51 may comprise an electrical control 54 including a wire harness 56 that may be directly connected to the solenoids of the hydraulic system. In this manner, the electrical control 54 may send control signals through the wire harness 56 to engage the valve solenoids and subsequently the hydraulic cylinders 49. In one embodiment, the control system 51 may be a wireless control system 52. By "wireless" it is meant that the components of the control system 52 communicate electrically by electromagnetic signals transmitted through the air. In one embodiment, the wireless control system 52 may include a transmitter 59 for transmitting wireless signals, and a receiver 63 for receiving wireless signals.

With reference now to FIGS. 1 and 2, the receiver 63, which may be contained in a control housing 65, receives the wireless signals transmitted by the transmitter 59 and communicates corresponding control signals to the actuation device 18 to move the platform 24, as described above. The receiver 63 may include an antenna 74 to aid in receiving the wireless signals sent by the transmitter 59. The receiver 63 may include a wiring harness 56, which may include electrical wires 56' for obtaining power from the vehicle 5 and output wiring 56" for actuating the solenoids and switches of the actuation mechanism 18 to adjust the platform 24 as described above. The receiver 63 may be mounted anywhere on the vehicle 5 or liftgate assembly 10 as chosen with sound engineering judgment.

With continuing reference to FIGS. 1-2, the transmitter 59 may generate an R.F. (Radio Frequency) signal, which may be FM (Frequency Modulated) modulated. The modulation may be a 120 bit data stream with start and stop bits, information concerning the selected switch being activated, and a specialized algorithm developed to ensure the validity of the transmission. The transmitter 59 may also transmit address information to enable the transmitter to "talk" to the receiver 63. This address information may be set so that no two devices will be the same. The receiver 63 may receive the radio signal transmitted by the transmitter 59, decode the data stream, and check for validity of the address and the start and stop bits of the received data. If this information is "correct," a software algorithm may perform to accept or reject the information to be passed on to the receiver outputs. If for any reason this test fails, no output will be sent from the receiver 63 to activate the actuation mechanism 18.

Still referring to FIGS. 1-2, the transmitter 59 may require a power supply, which can be a battery pack 72. The battery pack 72 may be located within a housing 74 of the transmitter 59, or the transmitter 59 may obtain its power directly from a vehicle power source. For example, power supply wires 76 extending from the transmitter 59 may be adapted to be plugged into the auxiliary power outlet or cigarette lighter of vehicle 5. The transmitter 59 may further include an antenna 74', for purposes of aiding in the transmission of control signals to the receiver 63. The transmitter 59 may include a plurality of joysticks, switches and/or toggle switches 79 for controlling the movement and positioning of the platform 24 or any other liftgate assembly 10 component. Any number and configuration of switches 79 may be chosen as is appropriate for use in controlling the liftgate assembly 10.

With continuing reference to FIGS. 1-2, the transmitter 59 should be easily accessible to the operator of the liftgate assembly 10. For safety precautions the transmitter 59 should be positioned in a convenient proximate location to the liftgate assembly 10 so that the operator may continuously observe movement of the platform 24 and any associated cargo. In one embodiment, the transmitter 59 is mounted permanently to the vehicle 5, either within the cab of the vehicle 5 or at a location outside of the vehicle cab. In an alternate embodiment, the transmitter b is not permanently attached to the liftgate assembly 10 or the vehicle 5, but instead may be portable. In this case, the transmitter 59 may be positioned in any desired location, including a location exterior to the vehicle 5 without the encumbrance wire harnesses or other electrical conductors. This is shown in FIG. 1.

Of course, the transmitter 59 must be located within a predetermined range of receiver 63 so that the signals transmitted can reach the receiver b.

With reference now to FIGS. 1-2 and 5-6, in order to assure that the operator is physically present to observe and oversee operation of the liftgate assembly 10 when it is being operated, the control system 51 may include a transmitter detection system 61 that prevents the actuation device 18 from operating to in any way adjust the liftgate assembly 10 unless the transmitter 59 is positioned in a predetermined location. The transmitter detection system 61 may include an electric circuit 62 that is closed or completed only when the transmitter 59 is in the correct predetermined location. The transmitter 59 may be electrically connected to the circuit 62 so that the transmitter 59 can only send a wireless signal to the receiver 63 if the circuit 62 is completed. In this case, when the transmitter 59 is not in the predetermined location, the transmitter 59 cannot send a control signal (regardless of the adjustment of controls 79) to the receiver 63. As a result, no signal is sent by the receiver 63 and operation of the actuation mechanism 18 is prevented. In an alternate embodiment, the transmitter detection system 61 may not affect the transmission of the wireless signal but rather the circuit 62 may prevent one or more portions of the actuation mechanism 18 from operating. In either case, the liftgate assembly 10 cannot be operated unless the transmitter 59 is positioned in the predetermined location.

With reference now to FIGS. 1-2, 5 and 7 as noted above, the transmitter 59 may be mounted directly to the vehicle 5, as shown in FIG. 1, in any conventional manner. The mount may be permanent or may be temporary, permitting the transmitter 59 to be portable, as will be discussed further below. In one embodiment, the transmitter 59 may have two open contacts 64 on the back surface of the transmitter 59, as shown in FIG. 5. FIG. 7 shows the circuit 62 for this embodiment including a battery or power source 80 (which could be the previously noted battery pack 72), an open portion 82 defined by the open contacts 64, a ground 84 and a space 86 which can contain other electric components as may be required. As is well known, an electric circuit is only complete (or closed) when current can flow from the power source 80 to ground 84. When the circuit is not complete (or open) current cannot flow. As the operation of an electric circuit is well known, other details will not be provided here. For this embodiment, when the transmitter 59 is mounted to the vehicle 5, the two open contacts 64 contact the metal surface of the vehicle 5 which bridges the open contacts 64 and thus completes or closes the circuit 62. In this closed circuit condition, the transmitter 59 can be used to send a control signal to operate the actuation mechanism 18. When the transmitter 59 is not mounted to the vehicle 5, however, the open contacts 64 are not bridged and the circuit 62 remains open. In this open circuit condition, the transmitter 59 cannot send a control signal (or alternately, the actuation mechanism 18 cannot be operated).

With reference now to FIGS. 1-2, 6 and 7-8, in another embodiment, the transmitter 59 may have one or more magnetic contacts 67 on the back surface of the transmitter 59, as shown in FIG. 6. For this embodiment, the circuit 62 of FIG. 7 applies except that the open portion 82 of FIG. 7 is replaced with the open portion 82 of FIG. 8. For this embodiment, when the transmitter 59 is mounted to the vehicle 5, the magnetic contact 67 contacts the metal surface of the vehicle 5 which bridges the open portion 82 and thus completes or closes the circuit 62. In this closed circuit condition, the transmitter 59 can be used to send a control signal to operate the actuation mechanism 18. When the transmitter 59 is not mounted to the vehicle 5, however, the open portion 82 is not bridged and the circuit 62 remains open. In this open circuit condition, the transmitter 59 cannot send a control signal (or alternately, the actuation mechanism 18 cannot be operated).

With reference now to FIGS. 2-4 and 7, in yet another embodiment, the wireless control system 52 may include a cradle 60 that holds the transmitter 59 in place during use. The cradle 60 may be constructed from metal, plastic or other material that resists corrosion from exposure to the environment. Any configuration of cradle 60 may be chosen that securely receives the transmitter 59. The cradle 60 may be permanently affixed to the vehicle 5, as shown, and accordingly the transmitter 59 may be permanently received within the cradle 60. The cradle 60 may include an opening that allows access to the battery compartment of the transmitter 59. This allows the operator to change the battery of the transmitter 59 as needed without removing the transmitter 59 from the cradle 60. In one embodiment, the cradle 60 may be fixed in place via fasteners. Alternatively, the cradle 60 could be fashioned as part of the liftgate assembly 10 or the vehicle 5. In any case, the transmitter 59 may be locked in place into the cradle 60 via a lockable latch that can only be removed for repairs or replacement of the transmitter 59 by an authorized individual. Still any manner of locking the transmitter 59 in place may be chosen with sound engineering judgment. The cradle 60 may include a set of contacts 66. For this embodiment, the circuit 62 of FIG. 7 applies except that the contacts 64 of FIG. 7 are replaced with the contacts 66 of FIG. 3. The circuit 62 is only closed when the transmitter 59 is properly seated in the cradle 60 to electrically connect the contacts 66. In this way, if the operator removes the transmitter 59 from the cradle 60 in attempt to operate the transmitter 59 from a remote location, the circuit 62 will open and the actuation mechanism 18 will be prevented from operating.

With reference now to FIGS. 1-2, in another embodiment, the transmitter detection system 61 narrows, in proximity and direction, the effective range of transmission to the receiver 63. The transmitter 59 may include a proximity detection device that allows transmission of the wireless signal only if the transmitter 59 is in direct line of sight of and proximate to the receiver 63. An Infrared transmitter and detector may be incorporated into the electric circuit 62 and permit the circuit 62 to be closed (completed) only when the transmitter 59, and hence the operator, is within a predetermined distance from the liftgate assembly 10.

With reference now to FIGS. 1-4, 7 and 9, in still another embodiment, the transmitter detection system 61 may include a jumper circuit 100. The jumper circuit 100 can be used to override some of the electric circuit 62 requirements noted above. For this embodiment, the circuit 62 of FIG. 7 applies except that the open portion 82 of FIG. 7 is replaced with the open portion 82 of FIG. 9. In one embodiment, the jumper circuit 100 is placed within the transmitter 59 and is selectively adjustable by an electric switch into an "on" (or closed) condition and an "off" (or open) condition. When the jumper circuit 100 is switched on (closed), the open contacts 64 are closed (as is the circuit 62) by the jumper circuit 100 and the transmitter 59 can be used even when the transmitter is not mounted to the vehicle 5. This permits the flexibility of manufacturing essentially the same transmitter 59 for use as either a permanent mount control or as a portable hand held control. In another embodiment, the jumper circuit 100 is placed within the cradle 60 and is selectively adjustable by an electric switch into an "on" (or closed) condition and an "off" (or open) condition. When the jumper circuit 100 is switched on (closed), the previously mentioned contacts 66 are closed (as is the circuit 62) by the jumper circuit 100 and the transmitter 59 can be used even when the transmitter is not placed within the cradle 60. This also provides flexibility of manufacturing the same transmitter 59 for use as either a cradle mount control or as a portable hand held control. It should be noted that when a jumper circuit 100 is used it is still possible to limit the distance from which the transmitter 59 can be used using, for example, the previously described proximity detection device.

With reference now to all the FIGURES, the wireless control system 52 described above has been used with a liftgate assembly 10. However, it should be noted that the wireless control system 52 of this invention could be used with other apparatuses in other applications as well; especially when it is desirable to require that the transmitter (and thus the operator) be at a predetermined location. Non-limiting examples of other uses for the wireless control system 52 are cranes, car haulers, tow trucks, electric winches used at marinas to lower boats into the water, and the like.

The preferred embodiments have been described, hereinabove. It will be apparent to those skilled in the art that the above methods may incorporate changes and modifications without departing from the general scope of this invention. For example, the wireless control 51, including the transmitter 59 and receiver 63, may wirelessly operate on any type and configuration of signal modulation. Additionally, it should be understood that any form of wireless communication may be used to communicate signals from the transmitter 59 to the receiver 63 including, but not limited to, infrared, and other frequency ranges of electromagnetically generated signals. It should also be noted that any type and configuration of electrical or electronic circuitry may be utilized to construct the receiver 63 transmitter 59 and overall control system 51 as chosen with sound engineering judgment. It is intended to include all such modifications and alterations in so far as they come within the scope of the appended claims or the equivalents thereof.

Having thus described the invention, it is now claimed:

1. A wireless control system for use with a vehicle having a cargo hold and a lifgate assembly that has a platform and an actuation mechanism for use in selectively adjusting the position of the platform with respect to the cargo hold, the wireless control system comprising:
    a transmitter for use in transmitting a wireless control signal, the transmitter having controls for selectively adjusting the platform;
    a receiver that receives the wireless control signal transmitted by the transmitter and communicates a corresponding control signal to the actuation mechanism to adjust the platform; and,
    a transmitter detection system that prevents the actuation mechanism from operating unless the transmitter is mounted to an exterior surface of the vehicle.

2. The wireless control system of claim 1, wherein the transmitter detection system comprises an electric circuit that is closed only when the transmitter is mounted to the exterior surface of the vehicle.

3. The wireless control system of claim 2, wherein the transmitter cannot transmit the wireless control signal when the electric circuit is open.

4. The wireless control system of claim 2, wherein the actuation device is inoperative regardless of the wireless control signal when the electric circuit is open.

5. The wireless control system of claim 2, wherein the transmitter further comprises:
    a pair of open contacts that are electrically closed and that are used to close the electric circuit only when the transmitter is mounted to the exterior surface of the vehicle.

6. The wireless control system of claim 3, wherein the transmitter further comprises:
    at least one magnetic contact that is used to close the electric circuit only when the transmitter is mounted to the exterior surface of the vehicle.

7. The wireless control system of claim 2 further comprising: a cradle that holds the transmitter to the exterior surface of the vehicle during use.

8. The wireless control system of claim 7, wherein the cradle further comprises:
    a set of contacts and wherein the circuit is only closed when the transmitter is properly seated in the cradle to electrically connect the contacts.

9. The wireless control system of claim 2 further comprising: an infrared transmitter and detector that is incorporated into the electric circuit.

10. The wireless control system of claim 2 further comprising: a jumper circuit for use in selectively overriding the electric circuit.

11. The wireless control system of claim 1, wherein the transmitter is mounted to the exterior surface of the vehicle in a location proximate to the liftgate assembly.

12. A vehicle comprising:
    a cargo hold; a liftgate assembly comprising:
    a platform;
    an actuation mechanism for use in selectively adjusting the position of the platform with respect to the cargo hold; and
    a wireless control system comprising:
    a portable transmitter for use in transmitting a wireless control signal, the transmitter having controls for selectively adjusting the platform, wherein the transmitter is removably mounted to an exterior surface of the vehicle in a location proximate to the lifgate assembly;
    a receiver that receives the wireless control signal transmitted by the transmitter and communicates a corresponding control signal to the actuation mechanism to adjust the platform;
    a pair of contacts that are closed and complete an electrical circuit only when the transmitter is mounted to the exterior surface of the vehicle; and
    wherein the transmitter can send a wireless control signal only when the pair of contacts are closed.

13. The vehicle of claim 12, wherein the pair of contacts are located on an outside surface of the transmitter.

14. The vehicle of claim 12, wherein the wireless control system further comprises:
    a cradle for receiving the transmitter;
    wherein the cradle is fixedly attached to the exterior surface of the vehicle;
    wherein the pair of contacts are located within the cradle; and
    wherein the pair of contacts are closed and complete the electrical circuit only when the transmitter is properly seated in the cradle.

15. The vehicle of claim 12, wherein the cargo hold further comprises:
    a curb side;
    a traffic side;
    a front end;
    a back end, wherein the lifgate assembly is operatively attached to the back end; and
    wherein the transmitter is mounted to the exterior surface of the curb side at a location adjacent to the back end of the cargo hold.

* * * * *